United States Patent [19]
Grisebach

[11] 4,382,618
[45] May 10, 1983

[54] HYDRAULIC COUPLING DEVICE

[75] Inventor: Hans-Theodor Grisebach, Unna, Fed. Rep. of Germany

[73] Assignee: Gewerkschaft Eisenhutte Westfalia, Fed. Rep. of Germany

[21] Appl. No.: 209,084

[22] Filed: Nov. 21, 1980

[30] Foreign Application Priority Data
Nov. 28, 1979 [DE] Fed. Rep. of Germany ....... 2947855

[51] Int. Cl.³ .............................................. F16L 39/00
[52] U.S. Cl. .................................. 285/137 R; 285/178
[58] Field of Search ............... 285/137 R, 178, 133 R, 285/133 A, 138, 137 A

[56] References Cited
U.S. PATENT DOCUMENTS

| 4,089,549 | 5/1978 | Vyse | 285/137 R |
| 4,113,287 | 9/1978 | Bogatirev et al. | 285/137 R |
| 4,116,476 | 9/1978 | Porter et al. | 285/137 R |

FOREIGN PATENT DOCUMENTS
2248119  4/1974  Fed. Rep. of Germany ...... 285/178

*Primary Examiner*—Dave W. Arola
*Attorney, Agent, or Firm*—Neil F. Markva

[57] ABSTRACT

A hydraulic coupling device is provided for connection to a multi-line hose constituted by a plurality of hydraulic conduits bunched together. The coupling device comprises a casing, a plurality of plug pins housed within the casing, and a holder for holding the plug pins. The plug pins are each connectible to a respective conduit of the multi-line hose. The holder is constituted by at least two retaining discs, and each plug pin is provided with two circumferential grooves. The retaining discs are each provided with a respective aperture through which one of the plug pins passes. Portions of the retaining discs adjacent to the apertures can be tightly engaged within the grooves in the plug pins, by being radially displaced and/or rotated relative to one another. In this way, the plug pins are axially fixed relative to the retaining discs.

28 Claims, 3 Drawing Figures

HYDRAULIC COUPLING DEVICE

BACKGROUND TO THE INVENTION

This invention relates to a hydraulic coupling device for connection to a multi-line hose constituted by a plurality of hydraulic conduits bunched together. The invention is particularly useful in the hydraulic distribution systems used in underground mine workings, particularly for hydraulically advanceable mine roof support assemblies and other hydraulic appliances.

Systems are known in which numerous hydraulic conduits are bunched together to form multi-line hoses. Multi-line hoses are interconnected by means of pairs of complementary hydraulic coupling devices. One coupling device of each pair houses a plurality of male plug pins which are attached to the conduits of one multi-line hose; and the other coupling device of that pair houses a plurality of female plug pins which are attached to the conduits of a second multi-line hose. The female plug pins mate with the male plug pins when the two coupling devices are attached (usually by the interengagement of complementary screw threads on their casings), thereby connecting the two multi-line hoses.

In one known hydraulic coupling device, the plug pins are held within the casing of the device by means of a pair of retaining discs, the plug pins passing through off-set holes in the retaining discs. The plug pins are either securely held, or held with slight play, between flanges provided on the retaining discs. Unfortunately, such retaining discs need to be differently shaped to enable them to hold the plug pins. This leads to increased production and storage costs. Moreover, the retaining discs have complicated shapes, so that the production costs are increased further. Furthermore, assembly of this type of hydraulic coupling device is difficult.

The aim of the invention is to provide a hydraulic coupling device which does not suffer from these disadvantages.

SUMMARY OF THE INVENTION

The present invention provides a hydraulic coupling device for connection to a multi-line hose constituted by a plurality of hydraulic conduits bunched together, the coupling device comprises a casing, a plurality of plug pins housed within the casing, and a holder for holding the plug pins. Each plug pin is connectible to a respective conduit of the multi-line hose. The holder includes at least two retaining discs and each plug pin being provided with at least one circumferential groove. The retaining discs are such that portions thereof can be tightly engaged within the grooves in the plug pins by being radially displaced and/or rotated relative to one another. Thus the plug pins are axially fixed relative to the retaining discs.

The retaining discs of this hydraulic coupling device can be identical, so that production and storage costs are reduced.

Advantageously, the holder is constituted by two retaining discs, and each plug pin is provided with two axially-spaced circumferential grooves, each retaining disc being associated with a respective groove of each of the plug pins.

Preferably, each retaining disc is provided with a respective aperture through which one of the plug pins passes. The portions of the retaining discs which engage within the grooves of the plug pins are portions that are adjacent to the apertures. Thus, the retaining discs of this hydraulic coupling device are simple, apertured discs which are easy and cheap to manufacture.

Conveniently, these groove engaging portions of the retaining discs are crescent-shaped, and engage crescent-shaped portions of the grooves in the plug pins. The movement of the retaining discs causes these groove engaging portions to move into the grooves in the plug pins. Where there are two retaining discs, the crescent-shaped groove engaging portions of each plug pin are on opposite sides thereof. In this way, the plug pins are held against movement both in the radial and axial directions.

Advantageously, the casing is generally cylindrical, and its inner surface is provided with at least one groove so positioned to receive contacting peripheral portions of the retaining discs when the retaining discs have been radially displaced and/or rotated relative to one another. In this way, the movement of the retaining discs which results in the axial fixing of the plug pins, also fixes the retaining discs to the casing. Preferably, the inner surface of the casing is provided with at least two axially-spaced grooves, each retaining disc being associated with a respective groove in the inner surface of the casing. Conveniently, the coacting peripheral portions of the retaining discs are crescent-shaped, and engage crescent-shaped portions of the grooves in the inner surface of the casing.

The retaining discs may be of reduced thickness in the regions of the pin groove engaging portions and the outer coacting peripheral portions. The reduced thickness parts of the retaining discs permit the use of separate grooves in both the plug pins and the inner surface of the casing. Preferably, the width of each of the grooves in the inner surface of the casing is greater than the thickness of the outer coacting peripheral portion of the respective retaining disc. This permits the retaining discs to have a slight amount of play, and so facilitates the mating of the plug pins with the complementary plug pins of a complementary hydraulic coupling device.

In underground mine workings, it is common for hydraulic conduits to be laid singly. Such single-line hoses are connected together by mating male and female plug pins. Such a plug pin has a circumferential groove in its exterior peripheral surface, the mating pair of plug pins being held together by means of a hose clip which engages within these grooves. Such plug pins are standardized with, each plug pin having standard dimensions and having a groove of standard width. The standard dimensions and width are determined by the pressure-rating of the associated hose line. Consequently, only a few types of plug pins need to be manufactured and stored for single-line hose connections. Such plug pins will be referred to throughout this specification as "standard plug pins". Advantageously, each of the plug pins is a standard plug pin (as hereinbefore defined).

Preferably, each of the retaining discs includes a hole which passes therethrough with said holes being aligned when the retaining discs have been radially displaced and/or rotated relative to one another within the casing. A locking pin passes through said holes to lock the retaining discs in the position in which the plug pins are axially fixed relative thereto. This fixes the retaining discs in their displaced positions, and prevents relative radial movement therebetween. Alternatively, each of the retaining discs includes a first and second holes passing therethrough, said first holes and said second holes being aligned when the retaining discs have been radially displaced and/or rotated relative to one another. A first locking pin passes through said first holes and a second locking pin passes through said second holes to lock the retaining discs in the position in which the plug pins are axially fixed relative thereto. Not only does this prevent relative radial movement between the retaining discs, but it also prevents relative rotation of the retaining discs.

In one preferred embodiment having just two retaining discs, the device further comprises a spacer disc which is sandwiched between the two retaining discs. The spacer disc includes apertures for the passage of the plug pins, which are radially supported by the apertured portions of the spacer disc. In this case, the spacer disc includes a respective hole for the passage of a locking pin.

In another preferred embodiment, there are three retaining discs, and a locking pin holds the retaining discs tightly together.

In any case, the locking pin may be a screw-threaded member having a tapered free end portion.

In the embodiment having two retaining discs and a spacer disc, the diameter of each said holes is, conveniently, greater than twice the depth of the grooves in the plug pins plus the radius of the locking pin.

The invention also provides a hydraulic coupling device for connection to a multi-line hose constituted by a plurality of hydraulic conduits bunched together. The coupling device comprises a casing, a plurality of plug pins housed within the casing, and a holder for holding the plug pins. The plug pins each are connectible to a respective conduit of the multi-line hose. The holder includes at least two retaining discs and the inner surface of the casing has at least one groove. The retaining discs are such that portions thereof can be tightly engaged within the groove(s) in the inner surface of the casing by being radially displaced and/or rotated relative to one another, whereby the retaining discs are axially fixed relative to the casing.

BRIEF DESCRIPTION OF THE DRAWINGS

Two forms of hydraulic coupling device, each constructed in accordance with the invention, will now be described, by way of example, with reference to the accompanying drawings, in which.

DESCRIPTION OF PREFERRED EMBODIMENTS

Figure 1:
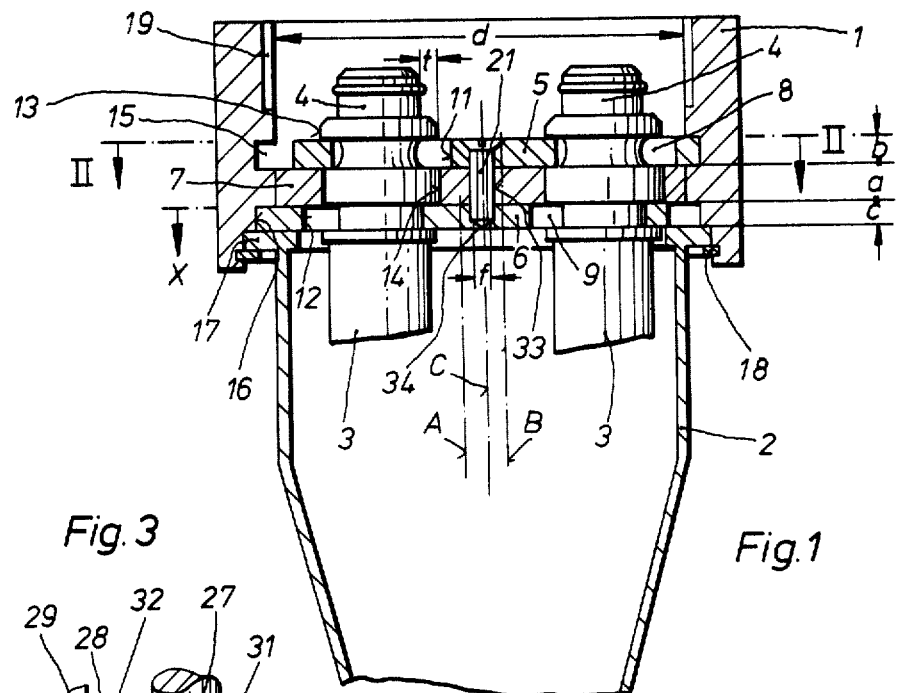
FIG. 1 is a part-sectional side elevation of a first form of hydraulic coupling device.

Referring to the drawings, FIG. 1 shows a hydraulic coupling device having a casing 1 constituted by an internally-threaded screw cap. The casing 1 is fixed to the end of a multi-line hose having a flexible sheath 2 which houses five flexible hydraulic conduits (pressure hoses) 3. Each of the flexible conduits 3 is connected to a respective male plug pin 4, the plug pin being held (in a manner described below) within the casing 1 by means of two identical retaining discs 5 and 6 and a spacer disc 7.

The plug pins 4 are standard plug pins of the type used for interconnecting single-line pressure hoses. Thus, each plug pin 4 has a circumferential groove 8 (which in single-line use receives a hose collar clip for connecting to a complementary standard female plug pin), and a circumferential groove 9 (which in single-line use is used for separating the two complementary standard plug pins). Each of the retaining discs 5,6 is provided with five equispaced, circular apertures 11,12 respectively. The apertures 11 and 12 are all of the same size, and have a diameter equal to the outer diameter of the plug pins 4. Thus, each plug pin 4 can just pass through the apertures 11 and 12 with its outer periphery 13 in engagement with the edges of the apertures. The spacer disc 7, whose thickness corresponds to the distance a between the grooves 8 and 9, is provided with five apertures 14, the size and arrangement of which correspond to those of the apertures 11 and 12. The thickness of the retaining discs 5 and 6 correspond respectively to the widths b and c of the grooves 8 and 9, so that the retaining discs are a substantially tight fit within these grooves. The outside diameters of the discs 5,6 and 7 are all the same, being slightly less than the inside diameter d of the casing 1, so that the discs 5,6 and 7 can easily be displaced axially within the casing.

The inner cylindrical surface of the casing 1 is formed with two axially-spaced, annular grooves 15 and 16. The distance between the grooves 15 and 16 is equal to the distance a between the grooves 8 and 9 in the plug pins 4. The widths of the grooves 15 and 16 are slightly greater than the thickness of the respective retaining discs 5 and 6, so that the retaining discs can engage within the grooves 15 and 16 with a small amount of play. The depth of the grooves 15 and 16 corresponds to the depth t of the grooves 8 and 9. Both axial ends of the groove 15 are defined by shoulders extending into the cylindrical wall of the casing 1. On the other hand, one axial end of the groove 16 is defined by such a shoulder, the other axial end being defined by a flange 17 provided at the free end of the flexible sheath 2. The flange 17 engages a shoulder provided adjacent to one end of the casing 1, the flange 17 being held against this shoulder by means of a circlip 18. The other end of the casing 1 is provided with an internal screw thread 19. A complementary hydraulic coupling device (not shown) having female plug pins, which mate with the male plug pins 4, has an externally-threaded portion which is engageable with the screw thread 19 to connect the coupling devices together.

In the illustrated positions, the retaining discs 5 and 6 engage both in the grooves 8 and 9 of the plug pins 4 and in the grooves 15 and 16 of the casing 1. Consequently, the plug pins 4 are held securely within the casing 1. In this position, the retaining discs 5 and 6 are radially off-set with respect to one another, and are radially displaced in opposite directions (that is to say their central longitudinal axes A and B are displaced, in opposite directions, with respect to the central longitudinal axis C of the casing 1). Thus, the retaining disc 5 engages within both the grooves 8 of the plug pins 4 and within the groove 15 of the casing 1, this engagement occurring over crescent-shaped zones in both cases (see FIG. 2). Similarly, the retaining disc 6 engages within the grooves 9 and 16 over crescent-shaped zones (see the portions "X" of FIG. 2 which are partial sections taken at the X of the upper surface of the retaining disc 6).

The retaining discs 5 and 6 are initially positioned within the casing 1 with their axes A and B coincident with the axis C of the casing; with the plug pins 4 positioned within the aligned apertures 11 and 12; and with the spacer disc 7 sandwiched between the retaining discs with its apertures 14 in alignment with the apertures 11 and 12. The retaining discs 5 and 6 are then moved into their illustrated positions by being radially displaced, and are locked in these positions by means of a screw-threaded member 21, which passes through the three discs 5,6 and 7 so as to clamp the retaining discs 5 and 6 to the spacer disc 7. The slight degree of play of the retaining discs 5 and 6 within the grooves 15 and 16 facilitates the connection between the male plug pins 4 and the female plug pins of the complementary hydraulic coupling device, particularly where there is slight misalignment of the two sets of plug pins.

Figure 2:
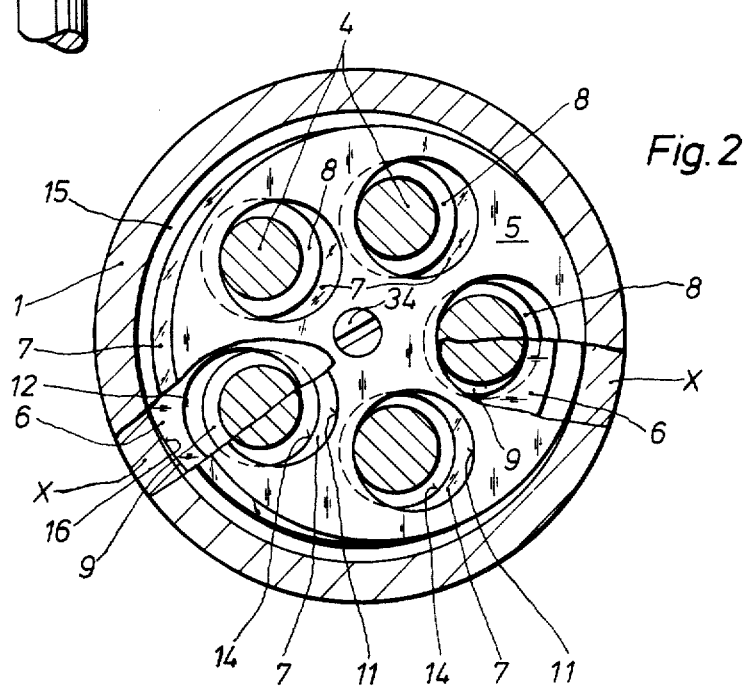
FIG. 2 is a cross-section taken on the line II—II of FIG. 1.

Although not shown in FIGS. 1 and 2, it is preferable to tap holes 33 (for the screw-threaded member 21) in the discs 5,6 and 7 whose diameter f is more than twice the depth t of the grooves 8 and 9 plus the radius of the screw-threaded member 21. In this case, the introduction of the screw-threaded member 21 into the non-aligned holes 33, causes these holes to be brought into alignment; which (in turn) displaces the retaining discs 5 and 6 in opposite directions, and so into tight engagement with the grooves 8 and 9. In order to facilitate the alignment of the tapped holes 33, the screw-threaded member 21 has a tapered tip 34.

Instead of moving the retaining discs 5 and 6 radially into the grooves 8 and 9, it is possible to rotate the discs in opposite directions to immobilize the plug pins 4. In this case, however, the retaining discs 5 and 6 do not engage in the grooves 15 and 16 in the casing 1, so that additional means must be provided for securing the retaining discs against axial movement within the casing. It would also be possible to move the retaining discs by a combination of radial displacement and rotation.

Figure 3:
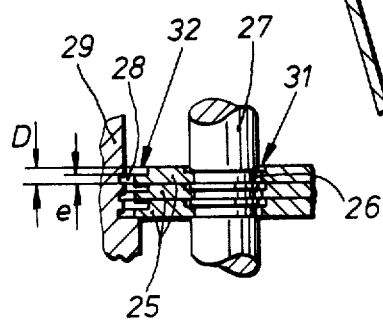
FIG. 3 is a part-sectional side elevation of part of a second form of hydraulic coupling device.

FIG. 3 shows a modified arrangement, in which three retaining discs 25 replace the retaining discs 5 and 6 and the spacer disc 7 of the arrangement of FIGS. 1 and 2. In this embodiment, each plug pin 27 is formed with three axially-spaced, circumferential grooves 26, and the inner cylindrical surface of the casing 29 of the hydraulic coupling device is provided with three axially-spaced, annular grooves 28. The three retaining discs 25 each have a thickness D, and each of the grooves 26 and 28 has a width e. The outer circumferential edges 32 of the retaining discs 25, and the edges 31 of their apertures, are of reduced thickness, these edge portions also having a thickness e, so that the discs can engage tightly within the grooves 26 and 28.

The retaining discs 25 are initially positioned within the casing 29 with their central longitudinal axes coincident with that of the casing. The retaining discs are then moved into their illustrated positions by being radially displaced relative to one another. The retaining discs 25 can then be locked in these positions by a screw-threaded member (not shown but similar to the member 21 of FIGS. 1 and 2). Here again, it is preferable for the tapped holes which receive the screw-threaded member to have a diameter twice the depth of the grooves 26 plus the radius of the screw-threaded member. In this embodiment, it is also possible to immobilize the plug pins 27 by relative rotation of the retaining discs 25. In this case, the retaining discs 25 are locked by means of a pair of screw-threaded members, the two locking members preventing relative rotation between the retaining discs 25 as well as preventing radial movement therebetween.

Although the hydraulic coupling device described above has male plug pins and a screw cap having an internal screw thread, it will be apparent that the invention is also applicable to a hydraulic coupling device having female plug pins and a screw cap having an external screw thread. The invention is, therefore, applicable to both the hydraulic coupling devices of a complementary pair of hydraulic coupling devices.

I claim:

1. A hydraulic coupling device for connection to a multi-line hose comprising a plurality of hydraulic conduits bunched together, the coupling device comprising:
    (a) a casing, a plurality of plug pins having at least one circumferential groove, and means for holding the plug pins within the casing,
    (b) each plug pin is connectable to a respective conduit of the multi-line hose,
    (c) the holding means including at least two retaining discs which are displaceable with respect to each other and have groove engaging portions for tightly engaging within a groove of each plug pin,
    (d) said retaining discs being effective to axially fix the plug pins when said discs are displaced with respect to each other, and
    (e) means for maintaining the discs in their displaceable relationship with respect to each other within said casing.

2. A hydraulic coupling device according to claim 1, wherein
    the retaining discs are radially displaceable relative to one another for engaging said groove engaging portions within the groove of each of the plug pins.

3. A hydraulic coupling device according to claim 2, wherein
    the holding means includes two retaining discs,
    each plug pin includes two axially-spaced circumferential grooves,
    each retaining disc being associated with a respective groove of each of the plug pins.

4. A hydraulic coupling device according to claim 1, wherein
    the retaining discs are rotatable relative to one another for engaging said groove engaging portions within the groove in each of the plug pins.

5. A hydraulic coupling device according to claim 1, wherein
    each of the plug pins is a standard plug pin.

6. A hydraulic coupling device according to claim 1, wherein
    the retaining discs are radially displaceable with respect to each other,
    each of the retaining discs has a locking hole passing therethrough and said locking holes are aligned when the retaining discs have been radially displaced relative to one another, and
    said disc maintaining means includes a locking pin which passes through said locking holes to lock the retaining discs in the position in which the plug pins are axially fixed relative thereto.

7. A hydraulic coupling device according to claim 6, wherein
    said holding means includes a spacer disc which is sandwiched between the two retaining discs,
    the spacer disc includes apertures for the passage of the plug pins, and the plug pins are radially supported by the apertured portions of the spacer disc.

8. A hydraulic coupling device according to claim 7, wherein
the spacer disc includes a respective hole for the passage of the locking pin.

9. A hydraulic coupling device according to claim 6, wherein
the locking pin is a screw-threaded member.

10. A hydraulic coupling device according to claim 6, wherein
the diameter of each of said locking holes is greater than twice the depth of the grooves in the plug pins plus the radius of the locking pin.

11. A hydraulic coupling device according to claim 6, wherein
the locking pin includes a tapered free end portion.

12. A hydraulic coupling device according to claim 1, wherein
the retaining discs are rotatable with respect to each other,
said disc maintaining means includes a locking hole passing through each retaining disc and a locking pin,
said locking holes being aligned when the retaining discs have been rotated relative to one another, and
the locking pin passes through said locking holes to lock the retaining discs in the position in which the plug pins are axially fixed relative thereto.

13. A hydraulic coupling device according to claim 12, wherein
there are three retaining discs, and
the locking pin holds the retaining discs tightly together.

14. A hydraulic coupling device according to claim 1, wherein
each of the plug pins is a male plug pin.

15. A hydraulic coupling device for connection to a multi-line hose comprising a plurality of hydraulic conduits bunched together, a coupling device comprising:
(a) a casing, a plurality of plug pins having at least one circumferential groove, and means for holding the plug pins within the casing,
(b) each plug pin is connectable to a respective conduit of the multi-line hose,
(c) the holding means including at least two retaining discs each having a respective aperture through which each one of the plug pins passes and having groove engaging portions to be tightly engaged with a groove of each plug pin,
(d) each of said apertures having a larger diameter than that of the respective groove in the associated plug pin,
(e) said retaining discs being displaceable with respect to each other to axially fix the plug pins with said groove engaging portions, and
(f) means for maintaining the discs in their displaceable relationship with respect to each other within the casing.

16. A hydraulic coupling device according to claim 15, wherein
said groove engaging portions of the retaining discs are located adjacent said apertures through which the plug pins pass.

17. A hydraulic coupling device according to claim 16, wherein
said groove engaging portions of the retaining discs are crescent-shaped and engage the groove of each of the plug pins along a crescent-shaped section thereof.

18. A hydraulic coupling device for connection to a multi-line hose comprising a plurality of hydraulic conduits bunched together, the coupling device comprising:
(a) a casing having a inner and outer surface,
(b) a plurality of plug pins having at least one circumferential groove,
(c) means for holding the plug pins within the casing,
(d) each plug pin is connectable to a respective conduit of the multi-line hose,
(e) the holding means including at least two retaining discs which are displaceable with respect to each other and have grooved engaging portions for tightly engaging within the groove of each plug pin,
(f) said discs being effective to axially fix the plug pins when said discs are displaced with respect to each other, and
(g) means located on the inner surface of the casing for maintaining the discs in their displaced relationship with respect to each other.

19. A hydraulic coupling device according to claim 18, wherein said disc maintaining means includes at least one groove positioned on said inner surface to receive peripheral contacting portions of the retaining discs when the retaining discs have been displaced relative to one another.

20. A hydraulic coupling device according to claim 19, wherein
said disc maintaining means includes at least two axially-shaped grooves on said inner surface,
each retaining disc being associated with a respective groove in the inner surface of the facing.

21. A hydraulic coupling device according to claim 20, wherein
said peripheral contacting portions are crescent-shaped and engage said grooves in the inner surface of the casing along said crescent sections thereof.

22. A hydraulic coupling device according to claim 18, wherein
the casing is generally cylindrical.

23. A hydraulic coupling device according to claim 18, wherein
the retaining discs are of reduced thickness in the regions of the groove engaging portions.

24. A hydraulic coupling device according to claim 23, wherein,
the retaining discs are of reduced thickness in the regions of said peripheral contacting portions.

25. A hydraulic coupling device according to claim 18, wherein
the width of each of the grooves in the inner surface of the casing is greater than the thickness of said peripheral contacting portion of the respective retaining disc.

26. A hydraulic coupling device as defined in claim 18, wherein
said disc maintaining means includes at least one groove on the inner surface of the casing,
the retaining discs include peripheral contacting portions for tightly engaging within said at least one groove in the inner surface of the casing when said discs are displaced relative to one another to axially fix the retaining discs relative to the casing.

27. A hydraulic coupling device according to claim 26, wherein the retaining discs are radially displaceable relative to one another for engaging said peripheral contacting portions within said at least one groove in the inner surface of the casing.

28. A hydraulic coupling device according to claim 26, wherein the retaining discs are rotatable relative to one another for engaging said peripheral contacting portions within said at least one groove in the inner surface of the casing.

* * * * *